United States Patent
Varanasi et al.

(10) Patent No.: US 9,065,741 B1
(45) Date of Patent: Jun. 23, 2015

(54) METHODS AND APPARATUSES FOR IDENTIFYING AND ALLEVIATING INTERNAL BOTTLENECKS PRIOR TO PROCESSING PACKETS IN INTERNAL FEATURE MODULES

(75) Inventors: Ravi K. Varanasi, Santa Clara, CA (US); Ravishankar Ganeshithal, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 2515 days.

(21) Appl. No.: 10/672,476

(22) Filed: Sep. 25, 2003

(51) Int. Cl.
*H04L 12/801* (2013.01)
*H04L 29/06* (2006.01)
*H04L 12/911* (2013.01)
*H04L 12/863* (2013.01)
*H04L 12/851* (2013.01)

(52) U.S. Cl.
CPC ........... *H04L 47/12* (2013.01); *H04L 47/748* (2013.01); *H04L 47/6215* (2013.01); *H04L 47/2441* (2013.01); *H04L 63/0485* (2013.01)

(58) Field of Classification Search
USPC ........................................................ 709/232
See application file for complete search history.

(56) References Cited

U.S. PATENT DOCUMENTS

| | | | | |
|---|---|---|---|---|
| 6,167,445 | A * | 12/2000 | Gai et al. | 709/223 |
| 6,243,667 | B1 * | 6/2001 | Kerr et al. | 703/27 |
| 6,519,595 | B1 * | 2/2003 | Rose | 709/224 |
| 6,628,612 | B1 * | 9/2003 | Sabry et al. | 370/230 |
| 6,760,337 | B1 * | 7/2004 | Snyder et al. | 709/240 |
| 6,944,128 | B2 * | 9/2005 | Nichols | 370/235 |
| 7,185,073 | B1 * | 2/2007 | Gai et al. | 709/223 |
| 7,562,213 | B1 * | 7/2009 | Timms | 713/160 |
| 2002/0021701 | A1 * | 2/2002 | Lavian et al. | 370/401 |
| 2002/0069356 | A1 * | 6/2002 | Kim | 713/160 |
| 2002/0178282 | A1 * | 11/2002 | Mysore et al. | 709/234 |
| 2003/0035371 | A1 * | 2/2003 | Reed et al. | 370/230 |
| 2003/0120795 | A1 * | 6/2003 | Reinshmidt | 709/232 |
| 2004/0090974 | A1 * | 5/2004 | Balakrishnan et al. | 370/412 |

OTHER PUBLICATIONS

"QoS Classification and Marking Reference Guide to Implementing Crypto and QoS", Cisco Systems, Aug. 5, 2002, pp. 1-15 (retrieved from Wayback Machine web archive).*

(Continued)

*Primary Examiner* — Derrick Ferris
*Assistant Examiner* — Scott M Sciacca
(74) *Attorney, Agent, or Firm* — Hickman Palermo Becker Bingham LLP

(57) ABSTRACT

Methods and apparatuses for identifying and alleviating bottlenecks prior to processing packets in internal feature modules are described. First, a method is provided for aggregating the service policies of various physical interfaces, and using results of the aggregation to determine whether a packet processing engine is capable of satisfying the aggregated service policy information. Second, a method and apparatus for applying the aggregated service policy prior to processing in an internal feature module, such as a crypto-engine. Packets on routers/switches are expected to be subjected to certain policies to address resource contention or streamlining/prioritization on outbound interfaces. Internal bottlenecks that a user can neither see nor control may cause packet transmission guarantees to be violated. Encryption is an example of an internal service that adds overhead thereby creating an internal bottleneck. Such internal bottlenecks are cured through intelligent means of pre-processing and pre-application of certain policy rules.

18 Claims, 11 Drawing Sheets

(56) References Cited

OTHER PUBLICATIONS

Cisco Systems, Inc., "Configuring and Troubleshooting Cisco Network—Layer Encryption: Background—Part 1," 1992-2003, 41 pages.
Cisco Systems, Inc., "Cisco—Reference Guide to Implementing Crypto and QoS," 23 pages, date: 2004.
S. Kent, et al., "IP Encapsulating Security Payload (ESP)," Nov. 1998, Network Working Group, Request for Comments: 2406, pp. 1-22.
S. Kent, et al., "IP Authentication Header," Nov. 1998, Network Working Group, Request for Comments: 2402, pp. 1-22.
S. Kent, et al., "Security Architecture for the Internet Protocol," Nov. 1998, Network Working Group, Request for Comments: 2401, pp. 1-66.

* cited by examiner

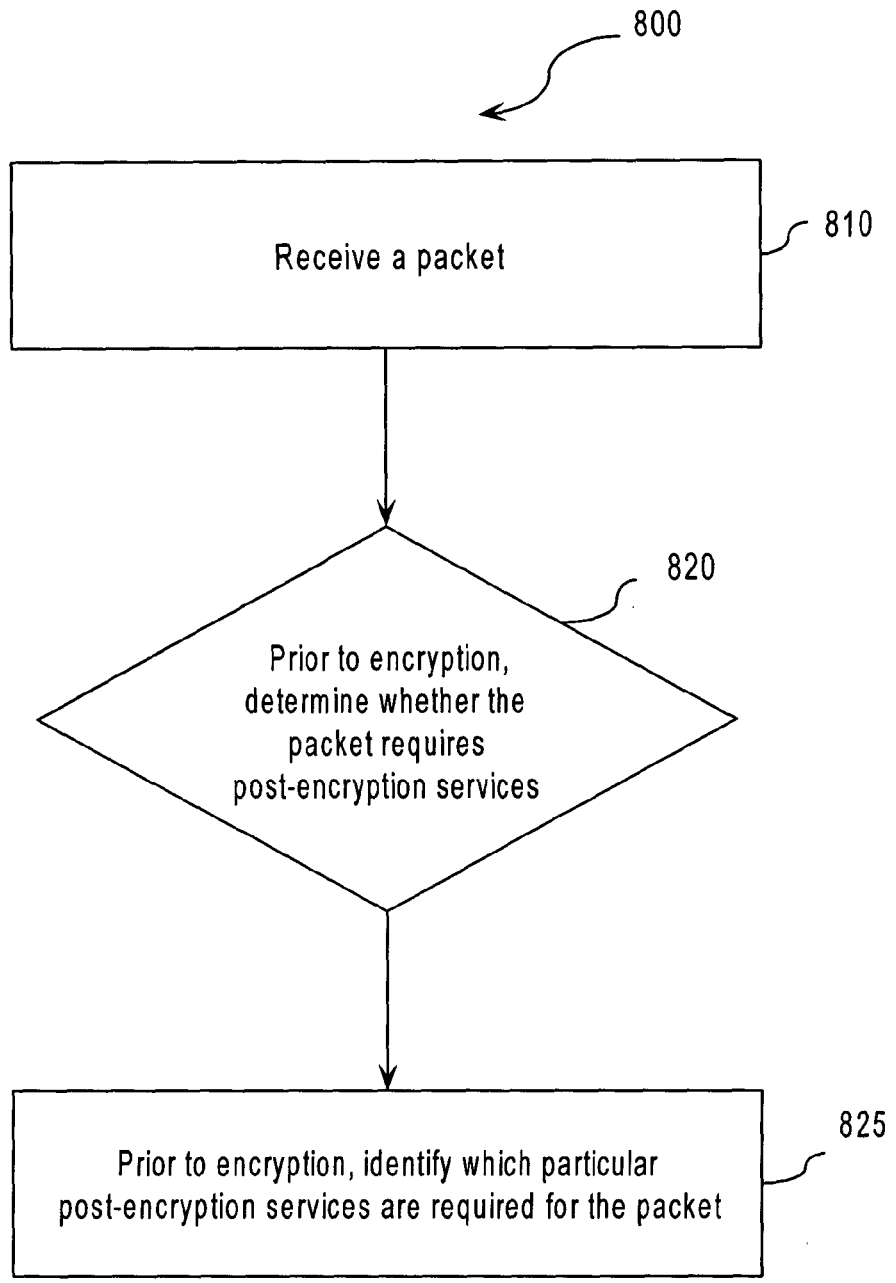

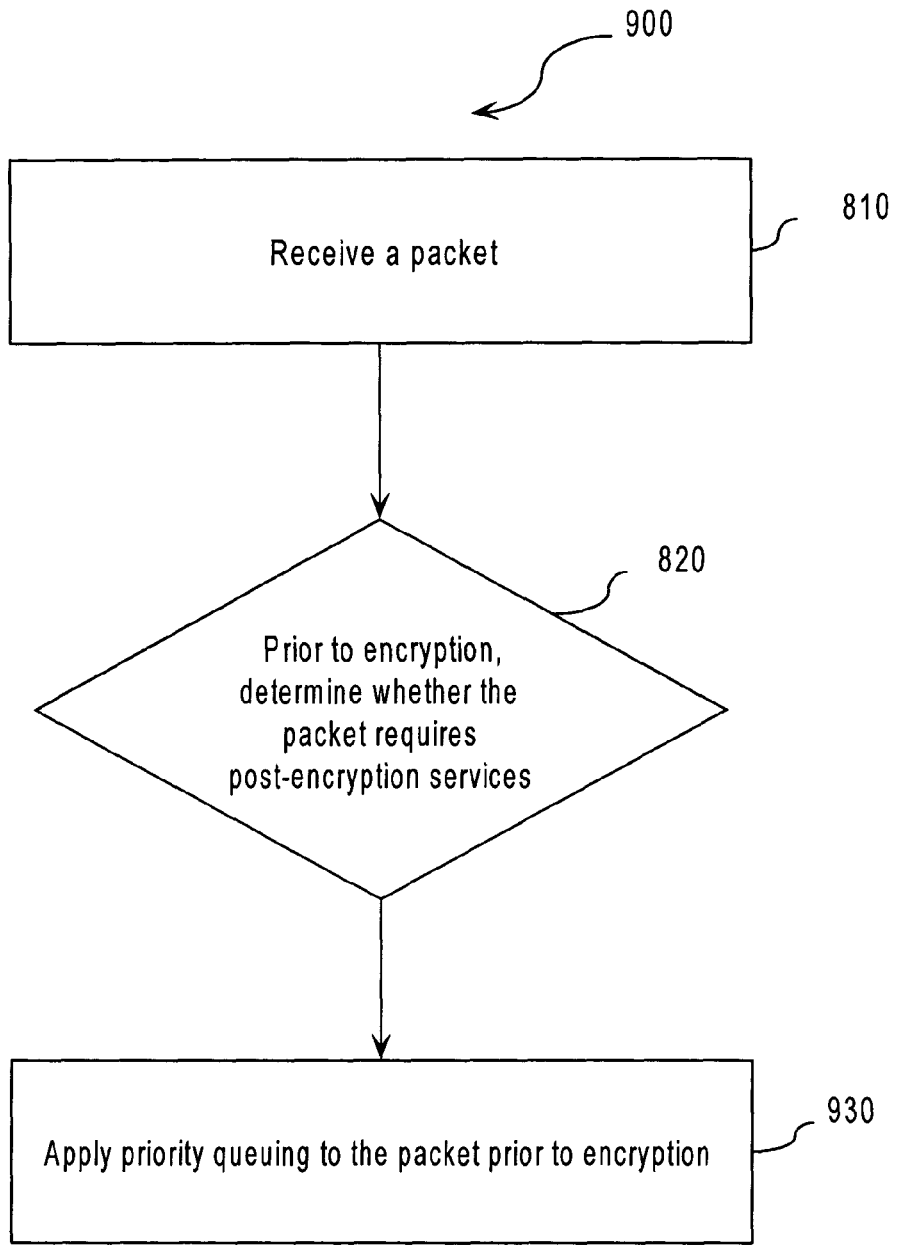

METHODS AND APPARATUSES FOR IDENTIFYING AND ALLEVIATING INTERNAL BOTTLENECKS PRIOR TO PROCESSING PACKETS IN INTERNAL FEATURE MODULES

FIELD OF THE INVENTION

The present invention generally relates to communication networks. The invention relates more specifically to methods and apparatuses for identifying and alleviating internal bottlenecks prior to processing packets in internal feature modules.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In most communication networks, services, such as security services, inspection and categorization, and other services are applied to packets. Bottlenecks often arise because of resource contention at internal feature modules of communication networks where services, such as security services, are applied. Internal feature modules, such as crypto-engines, are located between the ingress and egress interfaces of a communication network and are invisible to the user. Therefore, if an internal bottleneck occurs at an internal feature module, the user will be unaware of the internal bottleneck. Internal feature modules include components for applying features, which lie in the processing path of a packet in a communication network and may increase latency of packets through the communication network. At times of peak usage, internal bottlenecks can be very severe, causing disruption of end-to-end services and preventing the network from meeting service guarantees specified at egress interfaces.

When services are performed, an internal feature engine, such as a crypto-engine in a router or a switch in the case of security services, performs services on packets on a first-in-first-out (FIFO) basis. Packets of various types, such as real-time data (e.g., voice data) and non-real-time data, are treated equally (e.g., on a FIFO basis) by the internal feature module. No priorities can be assigned to packets today in front of these internal bottlenecks in the packet path and therefore, latency sensitive packets and other data packets (called best-effort packets) have an equal probability of being dropped and an equal treatment in terms of delays experienced in the FIFO queue if a bottleneck occurs at the internal feature module. If drops/delay of bandwidth/latency sensitive data packets occur frequently, there can be undesirable consequences. Some types of real time application traffic are very sensitive to latency, voice over IP being a very good example. If the latency of a voice packet is over 150 ms, the voice quality becomes uncomfortable to the human ear. Drops beyond certain thresholds have a similar effect. It would be desirable to have a method whereby such internal bottlenecks could be effectively handled.

The problems associated with bottlenecks are exacerbated in the context of the application of security services by a crypto-engine where a packet must undergo CPU-intensive operations that include policy checks and encryption/decryption process(es). In security services, such as IPsec, encryption and decryption are applied to data packets. Security services help in the authentication of data and improve confidentiality. During encryption/decryption, methods such as tunneling, which involve packet encapsulation/decapsulation are also employed.

The payload of an original data packet becomes obscured during encryption. Because the payload is obscured, it becomes difficult, if not impossible, to examine the contents of the payload data for attributes that are to be used as criteria for deciding whether to apply certain post-encryption services (e.g., egress services) to the packet. In short, because encryption obscures the payload, it is difficult to determine what post-encryption services should be applied to the packet.

In cases where a crypto-engine is expected to become an internal bottleneck, an option for determining which post-encryption services are to be applied is to use some type of proprietary pre-processing and classification on the packet such as copying the ToS bits from the original IP header. However, ToS bits may not provide enough information for classifying into all different categories. Information from more extensive classification mechanisms such as Access Control Lists that depend on multiple fields within the network/transport protocol headers need to be propagated to post-encryption egress services, which is not possible if such services are applied after the required portions of the packet have been obscured by encryption.

Based on the foregoing, there is a clear need for an efficient means of handling the bottlenecks and obfuscation problems that are associated with the application of services such as encryption at internal feature modules.

BRIEF DESCRIPTION OF THE DRAWINGS

The present invention is illustrated by way of example, and not by way of limitation, in the figures of the accompanying drawings and in which like reference numerals refer to similar elements and in which:

FIG. 8 is a flow chart that depicts an embodiment of method for identifying whether post-encryption services are required for a packet.

FIG. 9 is a flow chart that depicts an embodiment of a method for applying priority queuing to a data packet prior to encryption.

DETAILED DESCRIPTION OF THE INVENTION

Figure 1:
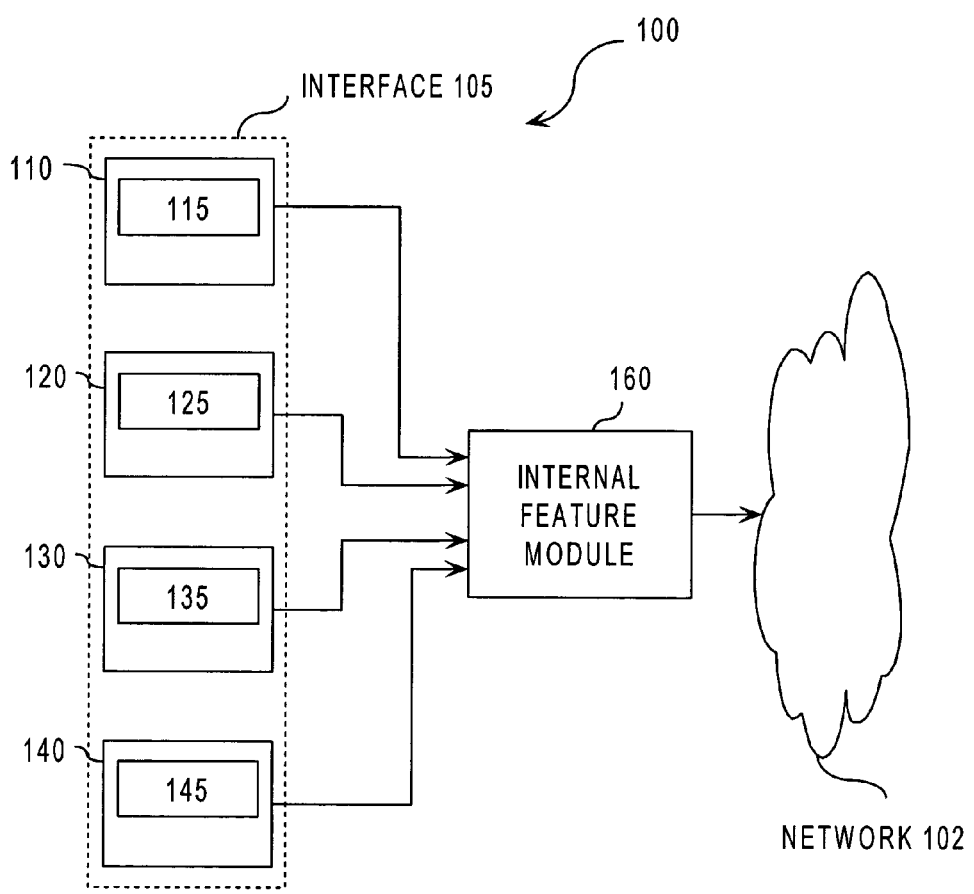
FIG. 1 is a block diagram that depicts an embodiment of a system including physical interfaces and internal feature module.

Methods and apparatus for identifying and alleviating internal bottlenecks prior to processing packets in internal feature modules are disclosed. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Identifying and Alleviating Internal Bottlenecks Prior to Processing Packets in Internal Feature Modules
  2.1 Identifying Internal Bottlenecks by Aggregating Service Policies
  2.2 Applying Aggregate Service Policies Prior to Processing Packets in Internal Feature Modules
3.0 Implementation Mechanisms—Hardware Overview
4.0 Extensions and Alternatives 1.0 General Overview The needs identified in the foregoing Background, and other needs and objects that will become apparent from the following description, are achieved in the present invention, which comprises methods and apparatuses for identifying and alleviating internal bottlenecks prior to processing a packet in internal feature modules.

First, a method and apparatus are disclosed for aggregating the user-configured service policies of various physical interfaces into a policy that can be applied on the internal feature modules where bottlenecks are expected to occur. The results of the aggregation may be used to determine whether an internal feature module is capable of satisfying the aggregated service policy. In an embodiment, if it is found that the aggregated service policy cannot be satisfied, the user may be advised to make changes to the service requirements so as to fall within the capabilities of the internal bottleneck. Second, a method and apparatus for applying the aggregate service policies to the internal bottleneck is described.

In one embodiment, where the internal bottleneck occurs at a crypto-engine, by identifying and aggregating post-encryption services prior to encryption, attributes of a data packet that are to be obscured by encryption are more accessible, and, therefore, the processing that is required for the packet can be more easily identified and can be facilitated more efficiently. The disclosed methods and apparatuses provide a means whereby downstream services that are rendered incapable of being applied due to resource contention issues may be applied by applying priority queuing to the packet before the packet gets obscured by internal encryption engines.

Therefore, the disclosed approaches also provide a means for prioritizing and scheduling packets for encryption and other services. Various services may be performed prior to encryption, such as enforcing bandwidth guarantees, deep packet inspection/identification, and URL matching.

In one embodiment, the invention may encompass a computer apparatus and a computer-readable medium configured to carry out the disclosed approaches.

2.0 Identifying and Alleviating Internal Bottlenecks Prior to Processing Packets in Internal Feature Modules Approaches, which may be used in combination, for identifying and alleviating bottlenecks prior to processing a packet in an internal feature module are disclosed.

2.1 Identifying Bottlenecks by Aggregating Service Policies

FIG. 1 depicts a block diagram of a system 100 including a plurality of physical interfaces 110, 120, 130 and 140, which are collectively referred to as physical interfaces 105. System 100 may comprise, for example, a router or switch in a packet network. Each physical interface 105 comprises a service policy 115, 125, 135 and 145. QoS service policies 115, 125, 135 and 145 each set forth services that are to be applied to packets sent from each physical interface 105. The QoS service policies may include system requirements, such as bandwidth requirements, that must be satisfied for a particular physical interface 105.

Service policies 115, 125, 135 and 145 are respectively associated with physical interfaces 110, 120, 130 and 140. The service policies 115, 125, 135 and 145 of various physical interfaces 105 may differ from one another. For example, a service policy 115, 125, 135 and 145 associated with a physical interface 105 that sends only voice data may dictate that a relatively large amount of priority bandwidth must be guaranteed for the physical interface 105 in order to ensure that the voice data can be transmitted along the network in a manner that meets necessary latency characteristics to provide acceptable sound quality. However, the service policy 115, 125, 135 and 145 associated with a physical interface 105 that sends primarily non-voice data, which does not need to be sent in real-time, may not stipulate that any amount of priority bandwidth as needed to send the non-voice data.

Each physical interface 105 is connected to a common shared internal feature module 160. In one embodiment, internal feature module 160 is a crypto-engine and this is the internal bottleneck that—if not addressed—nullifies the effect of service polices 115, 125, 135 and 145 that are expected to be applied downstream in the packet path at the outgoing physical interface. Generally, internal feature module 160 may be any internal component between the ingress and egress interfaces of a communication network that lies in the processing path of a packet, is invisible to the user and is configured to perform a service on a data packet. The approaches disclosed herein may be applied to alleviate bottlenecks that occur prior to processing in any type of internal feature module. Additionally, the approaches disclosed herein may also be applied to handle bottlenecks that occur at other internal components that do not perform a service on a data packet.

Data packets which are received or produced by a physical interface 105 are transmitted to other physical interfaces 105 or other locations in network 102. The data packets that are sent from a physical interface 105 may first be sent to internal feature module 160 for performing a service. After internal feature module 160 receives a data packet, internal feature module 160 performs a service on the data packet. For example, if internal feature module 160 is a crypto-engine, encryption may be the service that is performed on the data packet. Then, after the data packet has been processed by internal feature module 160, it is transmitted by internal feature module 160 to other locations in network 102, such as to another internal feature module 160, to a different physical interface 105, or to other components of the communication network 102.

Figure 2:
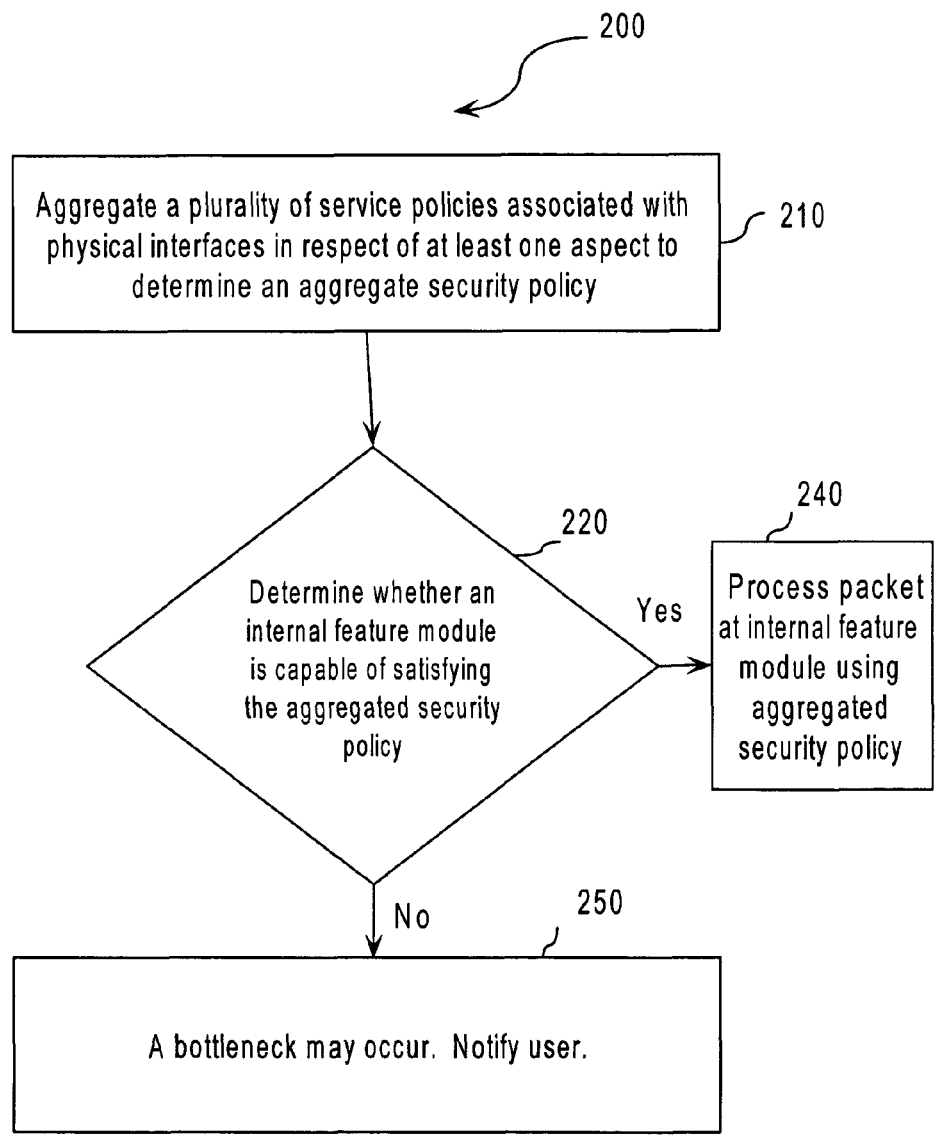
FIG. 2 is a flow chart that depicts an embodiment of a method for determining whether internal feature module is capable of servicing the service policies of multiple physical interfaces.

FIG. 2 depicts an embodiment of method 200 for determining whether internal feature module 160 is capable of satisfying the service policies of multiple physical interfaces. Using this method, it is possible to identify potential internal bottlenecks.

As shown in FIG. 2, in step 210, the plurality of service policies 115, 125, 135 and 145 that are associated with physical interfaces 105 will be aggregated in respect of at least one aspect to determine an aggregate service policy. The bandwidth required for data sent by various physical interfaces 105 is an example of an aspect of service policy in regard to which service policies 115, 125, 135 and 145 may be aggregated. Aggregation may involve one or more operations performed on one or more service policies. For example, in an embodiment, aggregation may involve totaling values associated with a particular aspect, such as a bandwidth requirement, of service policies. Various other operations may be performed. Examples of other aspects include, but are not limited to (1) priority bandwidth, which denotes how much data can be queued into a low latency queue; and (2) shaping, which denotes the upper bound to which a given flow should be made to conform.

In step 220, a determination is made of whether internal feature module 160 is capable of satisfying the aggregated service policy. In an embodiment, the determination made in step 220 may include a comparison of at least one aspect of the aggregate service policy and at least one characteristic of internal feature module 160.

As shown in step 240, if it is determined that internal feature module 160 is capable of servicing the aggregate service policy, the configuration can be accepted, and the packet is processed by internal feature module 160 in accordance with the aggregate service policy. For example, in an embodiment where internal feature module 160 is a crypto-engine, the packet may be encrypted, after enforcing the aggregated service policy prior to encryption.

As shown in step 250, if internal feature module 160 cannot satisfy the aggregate service policy, egress service guarantees cannot be honored and the user will be notified. When such a condition occurs, traffic at run-time may potentially overwhelm internal feature module 160, which will then be forced to drop the packets. Thus the service guaranteed at the egress interfaces might not be met. In this case the user may be forewarned to avoid or handle the bottlenecks via other means such as adjusting the value of at least one aspect of at least one egress service policy.

For example, assume that internal feature module 160 can provide a maximum bandwidth of 2000 megabits per second. Assume also that service policy 115 requires bandwidth of 800 megabits per second on the egress interface to service voice data that is sent from physical interface 110. Assume also that service policies 125, 135 each require bandwidth of 500 megabits per second on the egress interface to service conventional, non-voice data. Together, the aggregation of service polices 115, 125, 135 will require bandwidth of 1800 megabits per second. However, at this point, service policy 145 has not yet been aggregated. If service policy 145 requires 200 megabits or less per second, the maximum bandwidth of internal feature module 160, which is 2000 megabits per second, will be able to accommodate the aggregate requirement of all of the egress bandwidth requirements, which is less than or equal to 2000 megabits per second. Therefore, an internal bottleneck will not occur at internal feature module 160 at run time and all packets will be processed by internal feature module 160, in accordance with the aggregated service policy, which will be accommodated.

However, if service policy 145 requires bandwidth of more than 200 megabits per second, the maximum bandwidth of internal feature module 160 will not be sufficient to guarantee that all of the bandwidth requirements can be satisfied. As such, an internal bottleneck will potentially occur at internal feature module 160. Because of the internal bottleneck, the service guarantees on the egress interface might not be satisfied. Under the disclosed approach, the user will now be able to identify and be made aware of the internal bottleneck. In this case, the user will be warned that a bottleneck is likely to occur, and the requested bandwidth guarantees are not likely to be met. In such a case, if processing continues, a bottleneck may occur at internal feature module 160, and some data packets may need to be dropped. Egress service guarantees could never be met in this case, unless the user takes corrective action as described above.

The results of the aggregation of service policies, as well as the results of comparisons performed to determine whether internal feature module 160 is capable of servicing aggregated policies, may be reported to a user with a monitor or computer. The user may be warned that all of the service policies cannot be met. The user may also receive information about solutions for alleviating potential or existing bottlenecks that may be initiated automatically. Additionally, in step 250 the user may be informed of manual solutions for alleviating bottleneck. For example, the system may suggest reducing the priority bandwidth for a particular flow on a physical interface. In this regard, means for allowing a user to select a course of action in the event of a bottleneck may also be included in an embodiment.

By using the above aggregation approaches in combination with applying aggregate service policies, as described below, internal bottlenecks can be handled so that egress service guarantees can be met. Below, a method for applying service policies obtained through the above aggregation method, or which are identified through other approaches, is disclosed. The methods described herein, may be automatically or manually initiated.

2.2 Using Aggregated Service Policies Prior to Processing Packets in a Packet Processing Engine After the egress service policies have been aggregated, the aggregate service policy can be applied to all packets before sending packets to any feature module in the packet path. In other embodiments, the service policy may be obtained through other means. Enforcement of the aggregate service policy before sending packets to a feature module can be done in exactly the same way it is done at any one of the egress interfaces. While the enforcement method is the same, the policy and hence the service parameters themselves may be different from those at the egress service policies because of the aggregation. The following sections describe an embodiment in which the egress policies specify only priority queuing and hence the aggregate service policy contains priority queuing specification(s).

Figure 3:
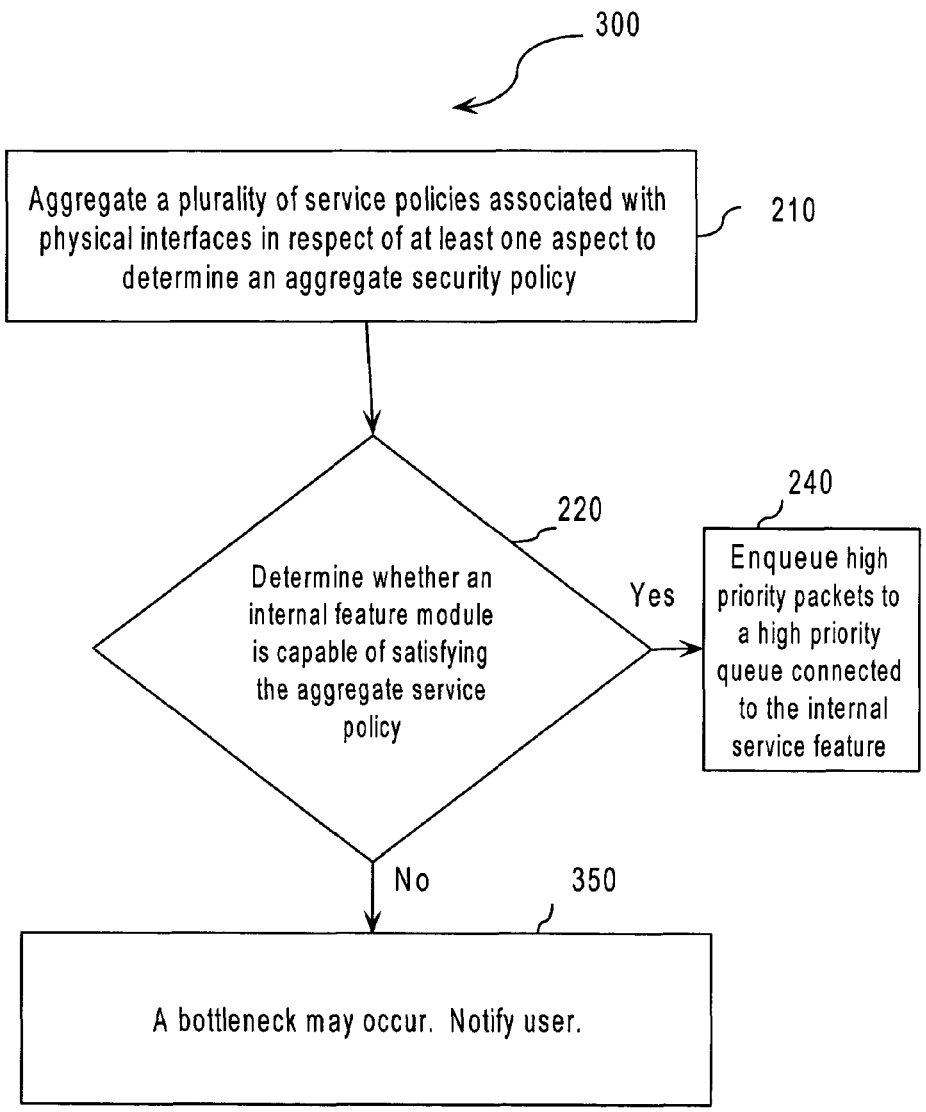
FIG. 3 is a flow chart that depicts an embodiment of a method, which includes the steps of the method of FIG. 2, with an additional step which helps to avoid, reduce or handle bottlenecks that occur at an internal feature module.

FIG. 3 depicts method 300 of how an aggregate service policy containing priority queuing specifications only can be applied to packets before sending them to an internal feature module. Method 300 includes the steps of method 200 and a detailed process of implementing step 240. Step 240 includes enqueuing high priority packets to a high priority queue connected to the internal feature module. Step 240 is an example of an approach that may be applied to ensure the same service guarantees are met for packets marked as high priority packets that are configured on the egress interfaces. Various steps of method 300 may be initiated, either manually or automatically, whenever a potential or existing bottleneck is identified by any approach, including the aggregation approaches described above.

In an embodiment, method 300 includes an additional step of identifying priorities associated with data packets. The packets that are identified as having high priority may be enqueued to the high priority queue. Data packets that are enqueued to the high priority queue are serviced by packet processing engine 160 prior to data packets that are not enqueued to the high priority queue. In embodiments, one queue or any other number of queues may be employed, and each queue may be associated with a different degree of priority. Queues may be dequeued in a relative sequence that corresponds to the priority associated therewith.

Data packets may be selected for enqueuing based on one or more specified criteria. For example, packets that require greater amounts of priority bandwidth, i.e., low latency, such as voice data packets, may be enqueued to a high priority queue so that the service of packet processing engine 160 may be applied to the voice data packets before the service is applied to non-voice data packets which require less bandwidth.

Figure 4:
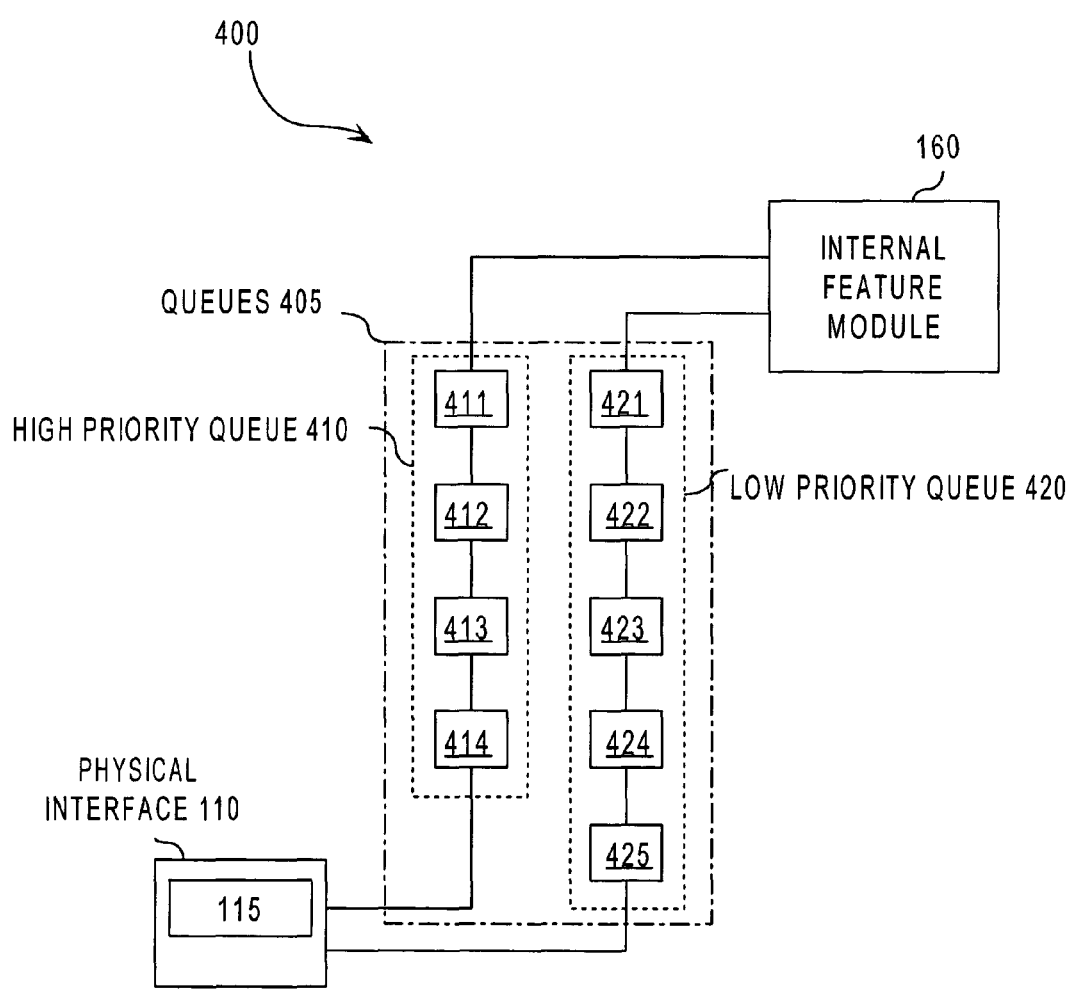
FIG. 4 is a block diagram that depicts an embodiment of an apparatus for priority queuing of packets intended for processing in an internal feature module.

FIG. 4 depicts a block diagram of an embodiment of apparatus 400 for priority queuing of packets intended for processing in an internal feature module 160. Apparatus 400 may be used to implement an embodiment of method 300, which is described above.

Apparatus 400 includes at least one physical interface 110. Service policy 115 is associated with physical interface 110. Apparatus 400 includes at least one internal processing engine 160.

Apparatus 400 includes at least one queue 405. A queue 405 may be used to facilitate priority processing of selected data packets. The embodiment shown in FIG. 4 includes two queues, high priority queue 410 and low priority queue 420, which are both connected to internal feature module 160. Data packets that are identified as high priority data packets are enqueued to high priority queue 410. Other packets are enqueued to low priority queue 420.

The priority that is associated with a data packet may be identified at physical interface 110, or may be identified by a mechanism placed between interface 110 and queues 405. In the embodiment shown in FIG. 4, data packets 411-414 have been identified as having high priority, and, therefore, are enqueued to high priority queue 410. Data packets 421-425 have been identified as having low priority, and, therefore, are enqueued to low priority queue 420.

In an embodiment, separate queues may be associated with particular downstream services. For example, separate queues may be associated with separate egress services that are to be performed after performing the service of internal feature module 160. Thus, data packets may be segregated into different queues based on one or more particular downstream services that are identified. Various different priorities may also be associated with the different downstream services identified.

Accordingly, based on the results of the classification of packet, a packet is enqueued, and is dequeued to internal feature module 160 for performing the service of internal service module 160. As a specific example, a packet is enqueued, and is then dequeued to internal feature module 160 for encryption. The queue holding the data packet may be dequeued to internal feature module 160 based on a priority vis a vis other queues, or, multiple queues may be dequeued without reference to any priority. Packets may be enqueued and dequeued in an order defined by a specified service policy.

By dequeuing high priority packets before low priority packets in conformanc with the aggregated service policy, it may bee ensured that the egress service guarantees are being met in every bottleneck in the packet path. For example, if data packets 411-414 are voice data packets which, according to service policy 115, require a relatively high amount of bandwidth, the prioritized dequeuing of the data packets 411-414 will result less latency through the internal bottleneck and the latency requirements of service policy 115 are satisfied.

As stated above, apparatus 400 may include any number of queues to implement any number of varying degrees of priority. Additionally, apparatus 400 may include multiple physical interfaces 110. Packets from each of the physical interfaces 110 may be enqueued to shared queues associated with a single packet processing engine 160. In an embodiment, apparatus 400 contains multiple internal feature modules 160. Various arrangements of multiple physical interfaces 110, multiple internal feature modules 160, and multiple queues may be employed to optimize the fulfillment of the requirements of the various service policies of the physical interfaces 110.

Figure 5:
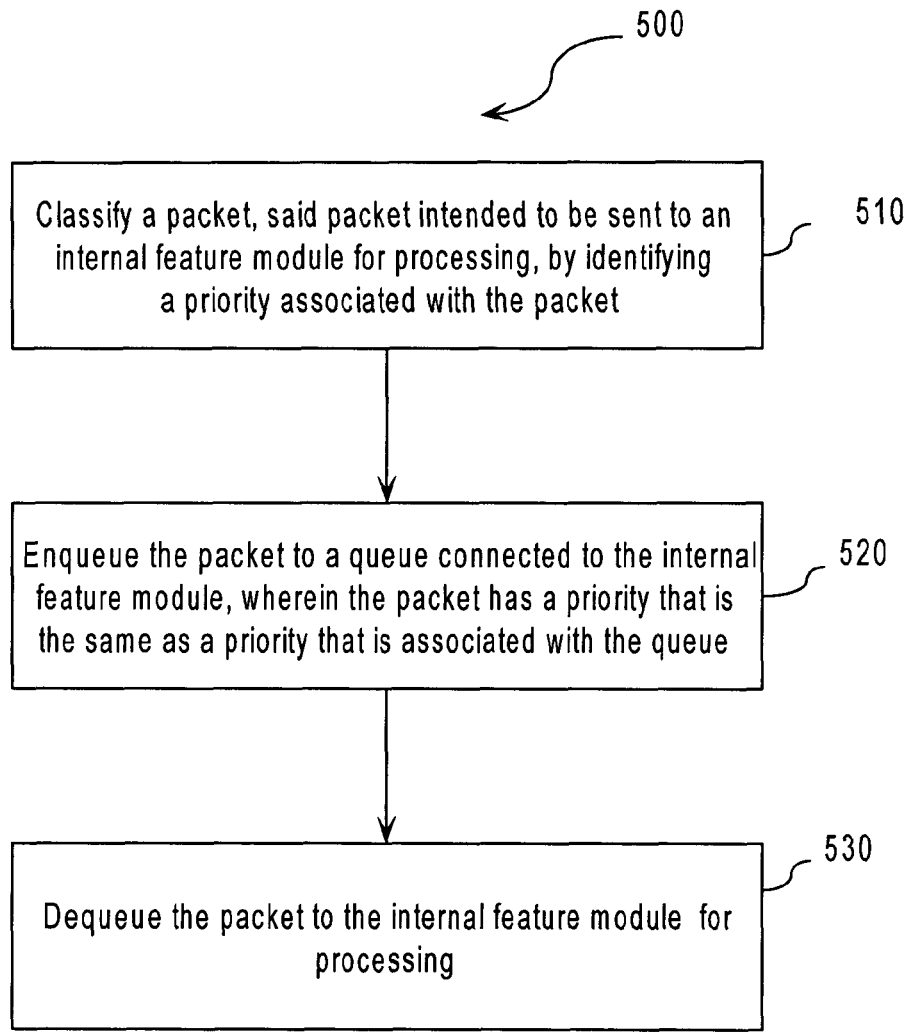
FIG. 5 is a flow chart that depicts an embodiment of a method of implementing the queuing approaches described in FIGS. 2 and 3.
Figure 6:
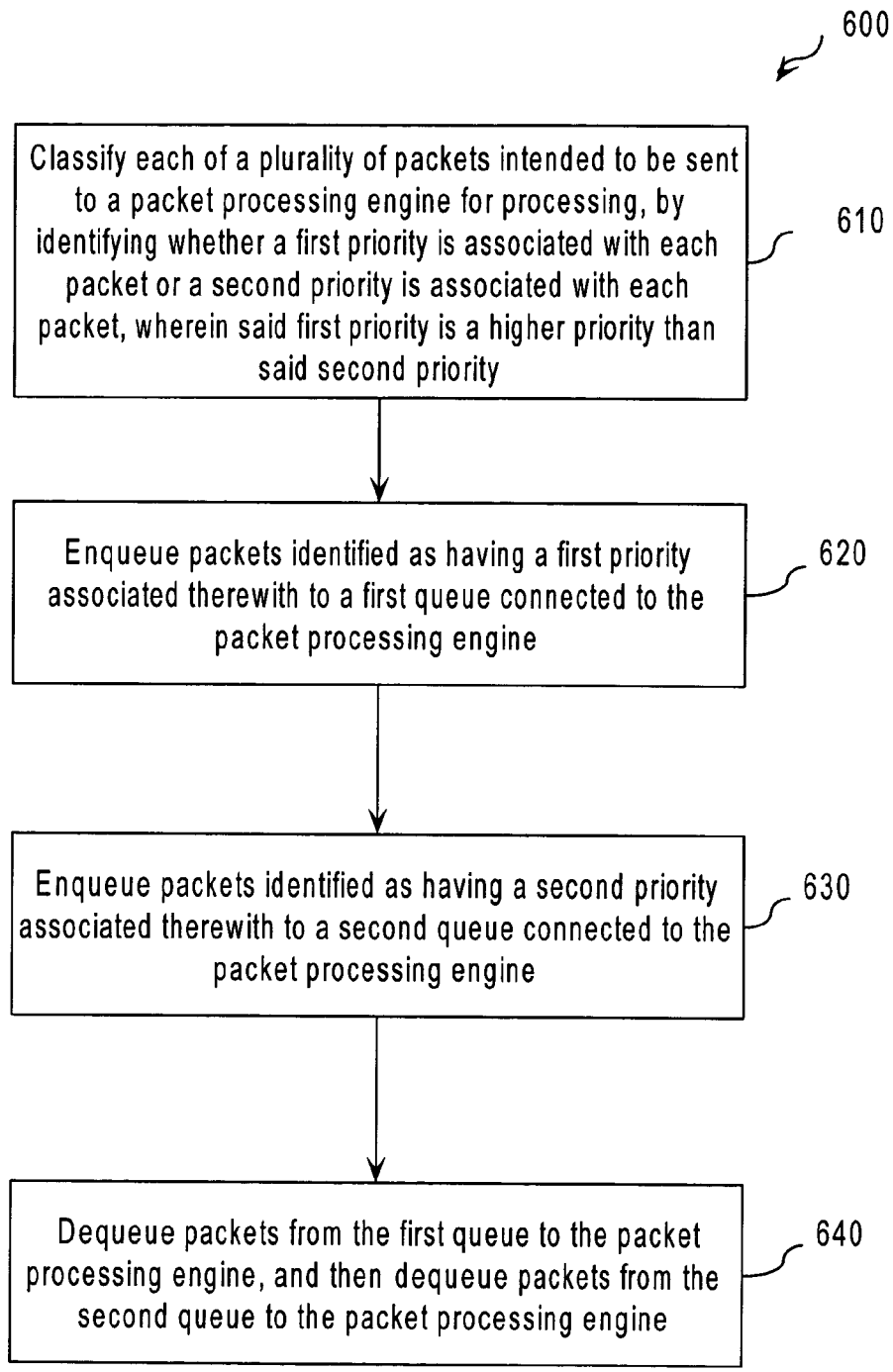
FIG. 6 is a flow chart that depicts an embodiment of a more detailed method for of implementing the queuing approaches described in FIGS. 2 and 3.

FIG. 5 and FIG. 6 describe examples of processes to implement the queuing principles that are disclosed in step 240 of FIG. 2 and FIG. 3. Method 500 in FIG. 5 describes an example of a process for implementing step 240 of FIG. 2 and/or FIG. 3. Method 600 in FIG. 6 describes another example of a process for implementing step 240 of FIG. 2 and/or FIG. 3.

Referring first to method 500 of FIG. 5, step 510 involves classifying a packet that is intended to be sent to an internal feature module 160 for processing, by identifying a priority associated with the packet. Step 520 includes enqueuing the packet to a queue connected to internal feature module 160, wherein the packet has a priority that is the same as a priority that is associated with the queue. Step 530 comprises dequeuing the packet to the internal feature module 160 for processing therein. In an embodiment, enqueuing and dequeuing is performed in separate interrupt contexts or by separate processes. In particular, dequeuing is performed in the context of a ready interrupt by internal feature module 160. Therefore, there is no need to enqueue and dequeue packets if a packet may be processed immediately by internal feature module 160. Various other enqueuing and dequeuing schemes may be employed.

Method 600 employs high and low-priority queues to handle an existing or potential internal bottleneck to ensure that priority queuing guarantees at the egress service policies are met. Step 610 comprises classifying each of a plurality of packets intended to be sent to an internal feature module 160 for processing, by identifying whether a first priority is associated with each packet or whether a second priority is associated with each packet, wherein the first priority is a higher priority than the second priority.

Step 620 includes enqueuing packets identified as having the first priority associated therewith to a first queue connected to internal feature module 160. Step 630 includes enqueuing packets identified as having the second priority to a second queue associated with internal feature module 160. Steps 620 and 630 may be performed sequentially, or, in embodiments, may be performed simultaneously. In embodiments, steps 620 and 630 may be initiated as appropriate on a packet by packet basis. Thus, as each packet is classified, the appropriate step among steps 620, 630 is performed, and the packet is enqueued to the appropriate queue.

In an embodiment, enqueuing and dequeuing is performed in separate interrupt contexts or by separate processes. In particular, dequeuing is performed in the context of a ready interrupt by internal feature module 160. Therefore, there is no need to enqueue and dequeue packets if a packet may be processed immediately by internal feature module 160. Various other enqueuing and dequeuing schemes may be employed.

As mentioned above, the problems associated with bottlenecks are exacerbated in the context of the application of security services by a crypto-engine because the payload in the original data packet becomes obscured during encryption, and may be further obscured if multiple encryption steps are performed. FIGS. 7A, 7B, 7C, 8, 9, and 10 describe the application of method 700 in the context of encryption. In an embodiment, these methods may be used in combination with the aggregation approaches described above to avoid bottlenecks at internal feature modules, so as to help ensure that service guarantees are met in respect of egress services.

Figure 7A:
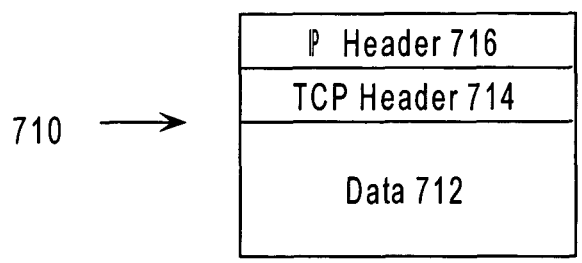
FIG. 7A depicts an embodiment of an unencapsulated packet.
Figure 7B:
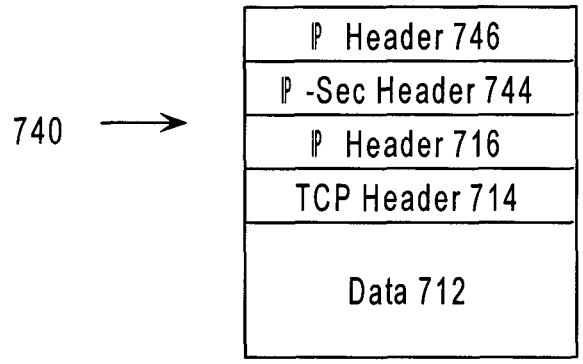
FIG. 7B depicts an embodiment of a packet that has undergone a single encapsulation.
Figure 7C:
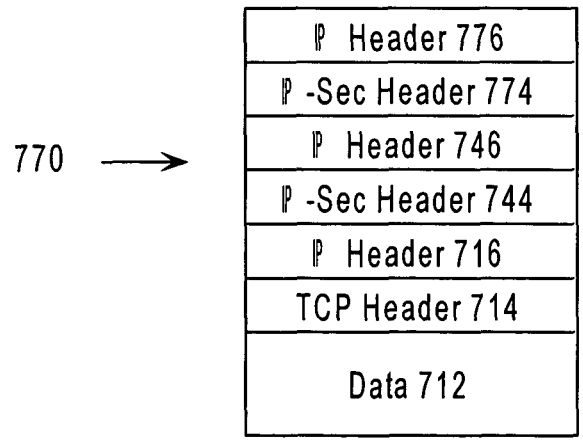
FIG. 7C depicts an embodiment of a packet that has undergone nested encapsulation.

FIGS. 7A-7C are block diagrams that describe examples of data obfuscation that occur during encapsulation processes in encryption. For example, FIG. 7A is a block diagram that depicts a packet 710 that has not yet been encapsulated. Packet 710 includes data 712, a TCP header 714, and an IP header 716.

FIG. 7B is a block diagram that depicts an encapsulated packet 740, which is generated by encapsulating packet 710. Packet 710 was encapsulated with IPsec header 744 and IP header 716 to create encapsulated packet 740.

FIG. 7C is a block diagram that depicts packet 710 that has undergone nested encapsulation. Encapsulated packet 740 was encapsulated with IPsec header 774 and IP header 776 to create packet 770. After the multiple encapsulation and encryption, the data payload in packet 770 is obscured.

FIG. 8 is a flow chart that depicts an embodiment of method 800 for determining whether post-encryption services are required for a packet. In step 810, a packet is received. Step 820 includes determining, prior to encryption, whether a data packet requires one or more post-encryption services. Optional step 825 includes identifying, prior to encryption, the particular post-encryption service(s) that are required for the packet.

FIG. 9 is a flow chart that depicts an embodiment of method 900 for performing priority queuing after the identification of post-encryption services. Method 900 includes the steps of method 800, as well as additional step 930. Step 930 includes applying the priority queuing to the packet prior to encryption. By applying priority queuing prior to encryption, data may be prioritized before the data is obscured by encryption.

Figure 10:
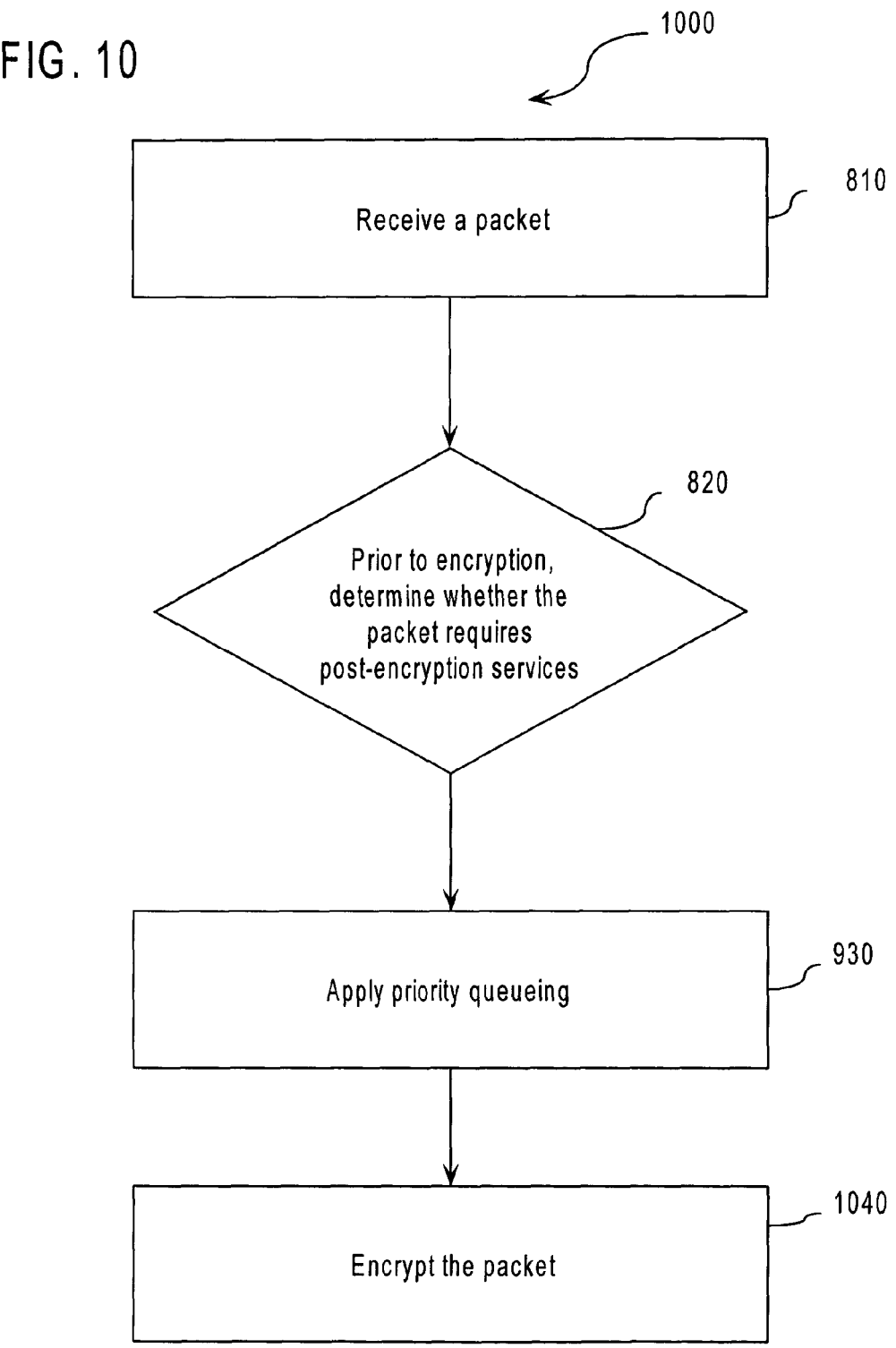
FIG. 10 is a flow chart that depicts and embodiment of method for encrypting a data packet after the application of priority queuing.

FIG. 10 is a flow chart that depicts an embodiment of method 1000 for encrypting a packet after the application of priority queuing. FIG. 10 includes the steps of method 900, and further includes step 1040. Step 1040 includes encrypting the packet. The encryption is performed after performing priority queuing to the packet in step 1030. As discussed above, encryption may be performed by various means, such as tunneling, which may involve encapsulating data packets with headers that may obscure the payload in the original data packet. The encrypted packet then may be transmitted across the communication network, and decrypted at another point in the network.

3.0 Implementation Mechanisms

Figure 11:
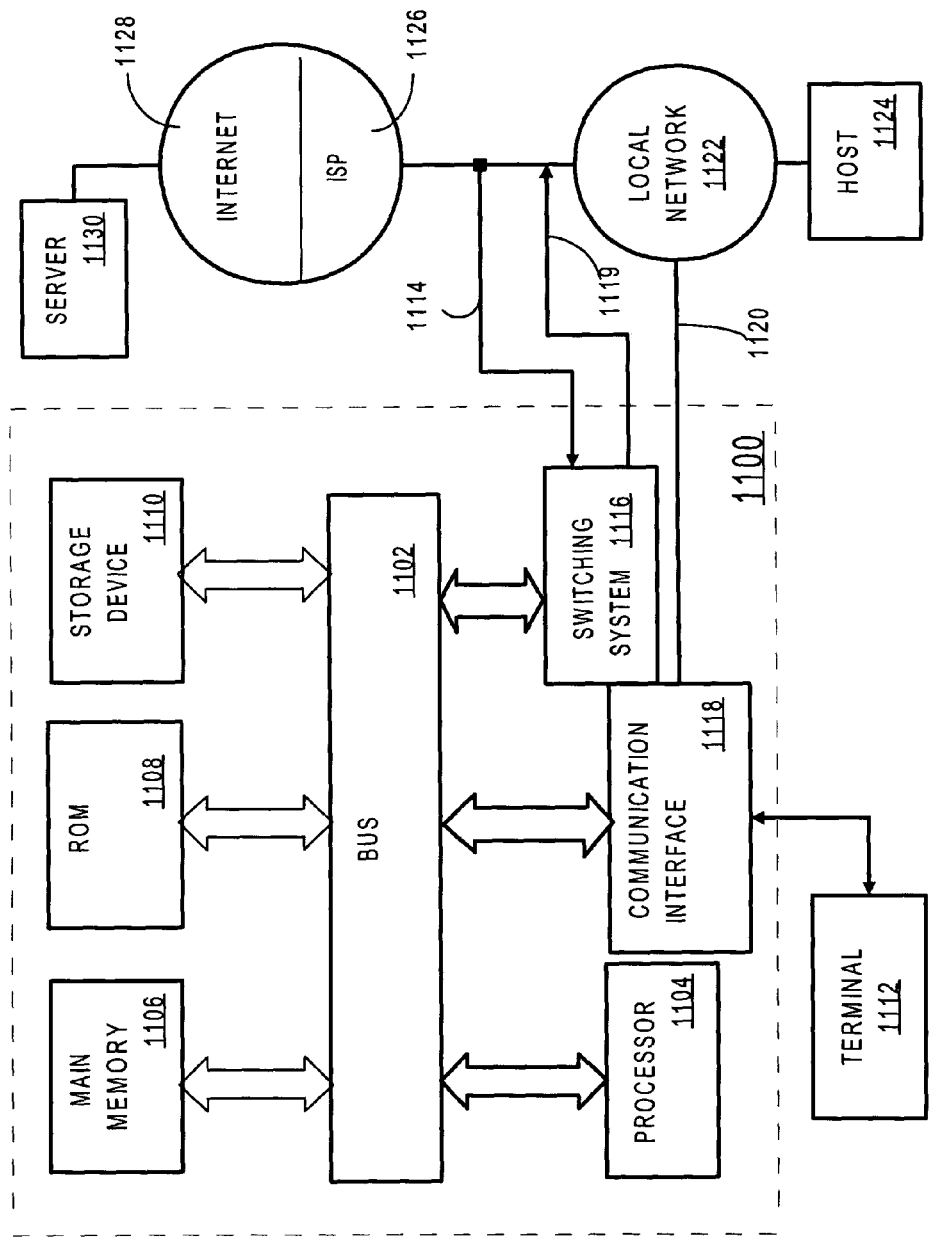
FIG. 11 depicts an embodiment of a system upon which the disclosed methods and apparatus may be implemented.

FIG. 11 is a block diagram that illustrates a computer system 1100 upon which an embodiment of the invention may be implemented. The preferred embodiment is implemented using one or more computer programs running on a network element such as a router device. Thus, in this embodiment, the computer system 1100 is a router.

Computer system 1100 includes a bus 1102 or other communication mechanism for communicating information, and a processor 1104 coupled with bus 1102 for processing information. Computer system 1100 also includes a main memory 1106, such as a random access memory (RAM), flash memory, or other dynamic storage device, coupled to bus 1102 for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage device coupled to bus 1102 for storing static information and instructions for processor 1104. A storage device 1110, such as a magnetic disk, flash memory or optical disk, is provided and coupled to bus 1102 for storing information and instructions.

A communication interface 1118 may be coupled to bus 1102 for communicating information and command selections to processor 1104. Interface 1118 is a conventional serial interface such as an RS-232 or RS-422 interface. An external terminal 1112 or other computer system connects to the computer system 1100 and provides commands to it using the interface 1114. Firmware or software running in the computer system 1100 provides a terminal interface or character-based command interface so that external commands can be given to the computer system.

A switching system 1116 is coupled to bus 1102 and has an input interface 1114 and an output interface 1119 to one or more external network elements. The external network elements may include a local network 1122 coupled to one or more hosts 1124, or a global network such as Internet 1128 having one or more servers 1130. The switching system 1116 switches information traffic arriving on input interface 1114 to output interface 1119 according to pre-determined protocols and conventions that are well known. For example, switching system 1116, in cooperation with processor 1104, can determine a destination of a packet of data arriving on input interface 1114 and send it to the correct destination using output interface 1119. The destinations may include host 1124, server 1130, other end stations, or other routing and switching devices in local network 1122 or Internet 1128.

The invention is related to the use of computer system 1100 for identifying and alleviating bottlenecks prior to processing a packet in a packet processing engine. According to one embodiment of the invention, bottlenecks are identified and/or alleviated when computer system 1100 in response to processor 1104 executing one or more sequences of one or more instructions contained in main memory 1106. Such instructions may be read into main memory 1106 from another computer-readable medium, such as storage device 1110. Execution of the sequences of instructions contained in main memory 1106 causes processor 1104 to perform the process steps described herein. One or more processors in a multi-processing arrangement may also be employed to execute the sequences of instructions contained in main memory 1106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1104 for execution. Such a medium may take many forms, including but not limited to, non-volatile media, volatile media, and transmission media. Non-volatile media includes, for example, optical or magnetic disks, such as storage device 1110. Volatile media includes dynamic memory, such as main memory 1106. Transmission media includes coaxial cables, copper wire and fiber optics, including the wires that comprise bus 1102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a telephone line using a modem. A modem local to computer system 1100 can receive the data on the telephone line and use an infrared transmitter to convert the data to an infrared signal. An infrared detector coupled to bus 1102 can receive the data carried in the infrared signal and place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Communication interface 1118 also provides a two-way data communication coupling to a network link 1120 that is connected to a local network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are exemplary forms of carrier waves transporting the information.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118. In accordance with the invention, one such downloaded application provides approaches for identifying and alleviating bottlenecks prior to processing a packet in a packet processing engine as described herein.

The received code may be executed by processor 1104 as it is received, and/or stored in storage device 1110, or other non-volatile storage for later execution. In this manner, computer system 1100 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   determining, prior to a shared internal feature module processing a plurality of packets, whether a total bandwidth of the shared internal feature module is sufficient to concurrently meet a plurality of bandwidth requirements at a corresponding plurality of downstream egress interfaces;
   responsive to determining that the total bandwidth of the shared internal feature module cannot concurrently meet the plurality of bandwidth requirements at the corresponding plurality of downstream egress interfaces, providing a notification that the shared internal feature module cannot concurrently meet the plurality of bandwidth requirements at the corresponding plurality of downstream egress interfaces;
   wherein the method is performed by at least one device comprising a processor; and
   wherein the shared internal feature module is a crypto-processor.

2. The method of claim 1, further comprising responsive to determining that the total bandwidth of the shared internal feature module can concurrently meet the plurality of bandwidth requirements, the shared internal feature module processing the plurality of packets.

3. The method of claim 1, further comprising adjusting at least one bandwidth requirement of the plurality of bandwidth requirements to obtain an adjusted bandwidth requirement, wherein the total bandwidth of the shared internal feature module can concurrently meet the plurality of bandwidth requirements with the adjusted bandwidth requirement.

4. The method of claim 1, further comprising receiving a service policy, comprising at least one bandwidth requirement of the plurality of bandwidth requirements, from a user program.

5. A method comprising:
   determining, prior to a shared internal feature module processing a plurality of packets, whether a total bandwidth of the shared internal feature module is sufficient to concurrently meet a plurality of bandwidth requirements at a corresponding plurality of downstream egress interfaces;
   in response to determining that the total bandwidth of the shared internal feature module cannot concurrently meet the plurality of bandwidth requirements, dropping a portion of the plurality of packets by the shared internal feature module to obtain a modified plurality of packets;
   the shared internal feature module processing the modified plurality of packets;
   wherein the method is performed by at least one device comprising a processor; and
   wherein the shared internal feature module is a crypto-processor.

6. The method of claim 5, further comprising receiving a service policy, comprising at least one bandwidth requirement of the plurality of bandwidth requirements, from a user program.

7. An apparatus, comprising:
a processor;
a shared internal feature module communicatively coupled with a plurality of downstream egress interfaces;
wherein the apparatus is configured to:
determine, prior to the shared internal feature module processing plurality of packets, whether a total bandwidth of the shared internal feature module is sufficient to concurrently meet a plurality of bandwidth requirements at a corresponding plurality of downstream egress interfaces;
responsive to determining that the total bandwidth of the shared internal feature module cannot concurrently meet the plurality of bandwidth requirements at the corresponding plurality of downstream egress interfaces, provide a notification that the shared internal feature module cannot concurrently meet the plurality of bandwidth requirements at the corresponding plurality of downstream egress interfaces;
wherein the shared internal feature module is a crypto-processor.

8. The apparatus of claim 7, wherein responsive to determining that the total bandwidth of the shared internal feature module can concurrently meet the plurality of bandwidth requirements, the shared internal feature module is configured to process the plurality of packets.

9. The apparatus of claim 7, wherein the apparatus is further configured to adjust at least one bandwidth requirement of the plurality of bandwidth requirements to obtain an adjusted bandwidth requirement, wherein the total bandwidth of the shared internal feature module can concurrently meet the plurality of bandwidth requirements with the adjusted bandwidth requirement.

10. The apparatus of claim 7, further configured to receive a service policy, comprising at least one bandwidth requirement of the plurality of bandwidth requirements, from a user program.

11. An apparatus, comprising:
a processor;
a shared internal feature module communicatively coupled with a plurality of downstream egress interfaces;
wherein the apparatus is configured to:
determine, prior to the shared internal feature module processing a plurality of packets, whether a total bandwidth of the shared internal feature module is sufficient to concurrently meet a plurality of bandwidth requirements at a corresponding plurality of downstream egress interfaces;
in response to determining that the total bandwidth of the shared internal feature module cannot concurrently meet the plurality of bandwidth requirements, drop a portion of the plurality of packets to obtain a modified plurality of packets;
wherein the shared internal feature module is configured to process the modified plurality of packets; and
wherein the shared internal feature module is a crypto-processor.

12. The apparatus of claim 11, further configured to receive a service policy, comprising at least one bandwidth requirement of the plurality of bandwidth requirements, from a user program.

13. A non-transitory computer-readable storage medium comprising one or more sequences of instructions, which when executed by one or more processors, cause the one or more processors to perform:
determining, prior to a shared internal feature module processing a plurality of packets, whether a total bandwidth of the shared internal feature module is sufficient to concurrently meet a plurality of bandwidth requirements at a corresponding plurality of downstream egress interfaces;
responsive to determining that the total bandwidth of the shared internal feature module cannot concurrently meet the plurality of bandwidth requirements at the corresponding plurality of downstream egress interfaces, providing a notification that the shared internal feature module cannot concurrently meet the plurality of bandwidth requirements at the corresponding plurality of downstream egress interfaces;
wherein the shared internal feature module is a crypto-processor.

14. The non-transitory computer-readable storage medium of claim 13, comprising one or more sequences of instructions, which when executed by one or more processors, cause the one or more processors to perform: responsive to determining that the total bandwidth of the shared internal feature module can concurrently meet the plurality of bandwidth requirements, the shared internal feature module processing the plurality of packets.

15. The non-transitory computer-readable storage medium of claim 13, comprising one or more sequences of instructions, which when executed by one or more processors, cause the one or more processors to perform: adjusting at least one bandwidth requirement of the plurality of bandwidth requirements to obtain an adjusted bandwidth requirement, wherein the total bandwidth of the shared internal feature module can concurrently meet the plurality of bandwidth requirements with the adjusted bandwidth requirement.

16. The non-transitory computer-readable storage medium of claim 13, comprising one or more sequences of instructions, which when executed by one or more processors, cause the one or more processors to perform: receiving a service policy, comprising at least one bandwidth requirement of the plurality of bandwidth requirements, from a user program.

17. A non-transitory computer-readable storage medium, comprising one or more sequences of instructions, which when executed by one or more processors, cause the one or more processors to perform:
determining, prior to a shared internal feature module processing a plurality of packets, whether a total bandwidth of the shared internal feature module is sufficient to concurrently meet a plurality of bandwidth requirements at a corresponding plurality of downstream egress interfaces;
in response to determining that the total bandwidth of the shared internal feature module cannot concurrently meet the plurality of bandwidth requirements, dropping a portion of the plurality of packets by the shared internal feature module to obtain a modified plurality of packets;
the shared internal feature module processing the modified plurality of packets;
wherein the shared internal feature module is a crypto-processor.

18. The non-transitory computer-readable storage medium of claim 17, comprising one or more sequences of instructions, which when executed by one or more processors, cause the one or more processors to perform: receiving a service policy, comprising at least one bandwidth requirement of the plurality of bandwidth requirements, from a user program.

\* \* \* \* \*